United States Patent Office 3,051,143
Patented Aug. 28, 1962

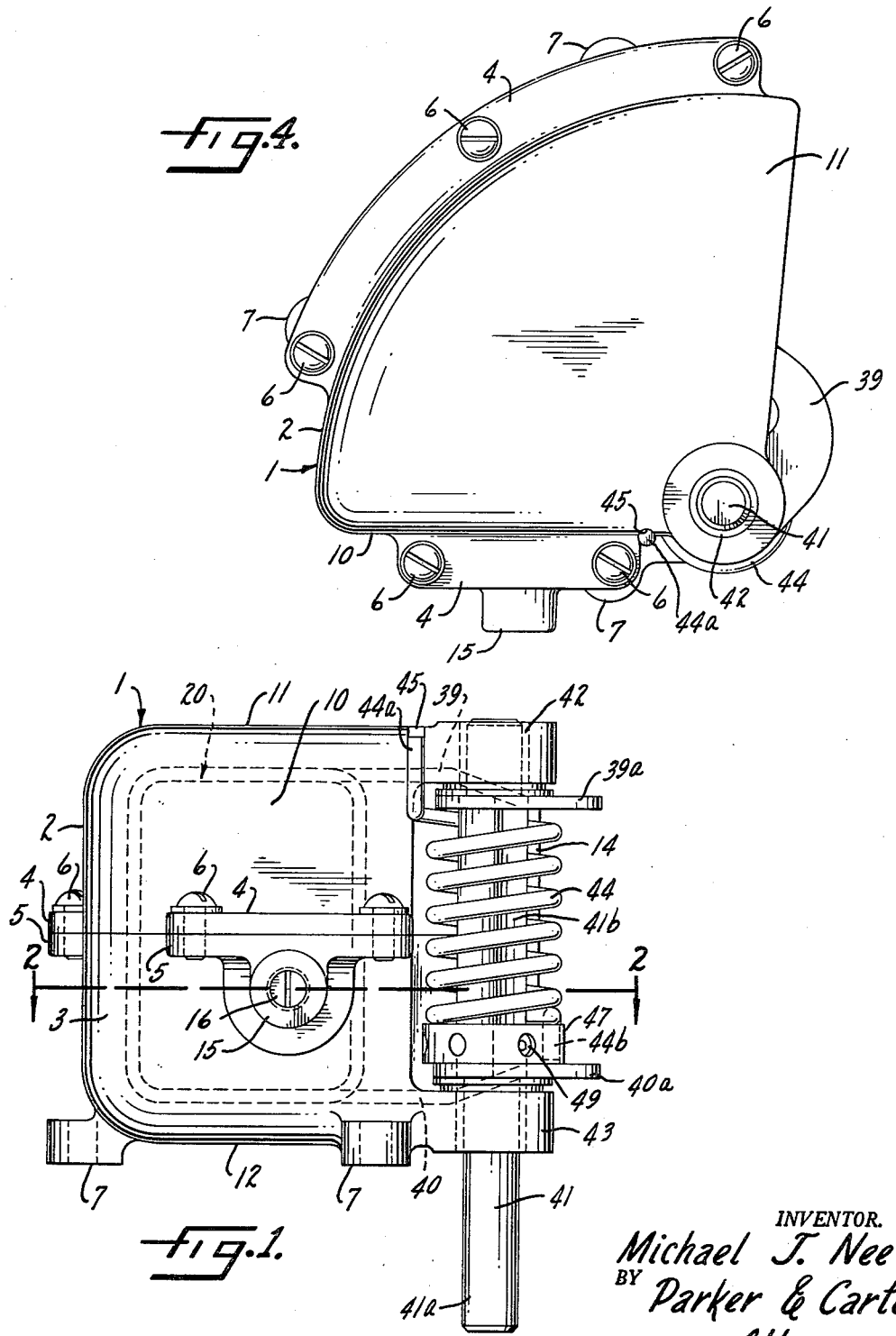

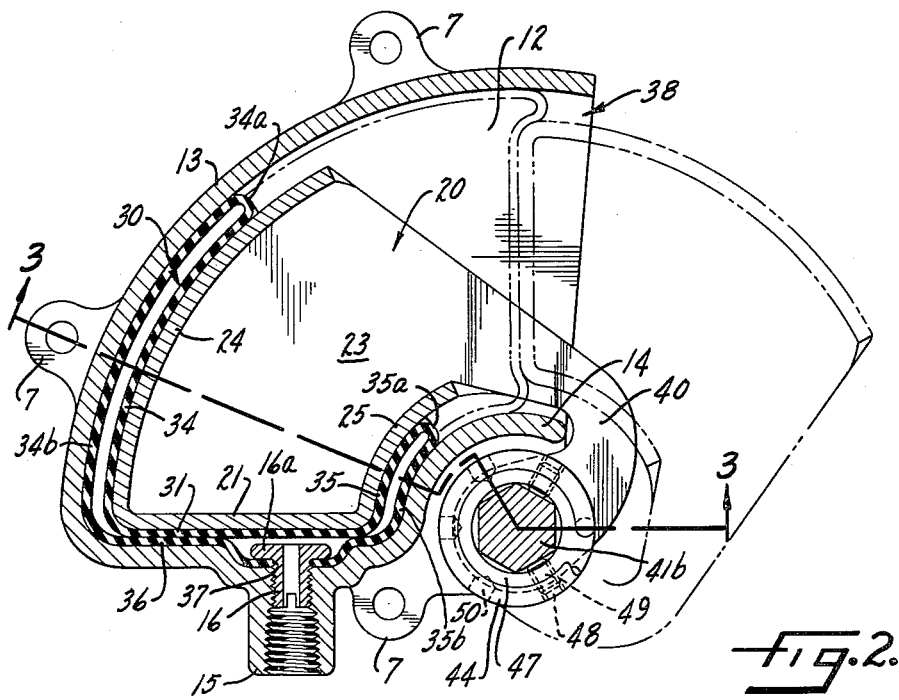
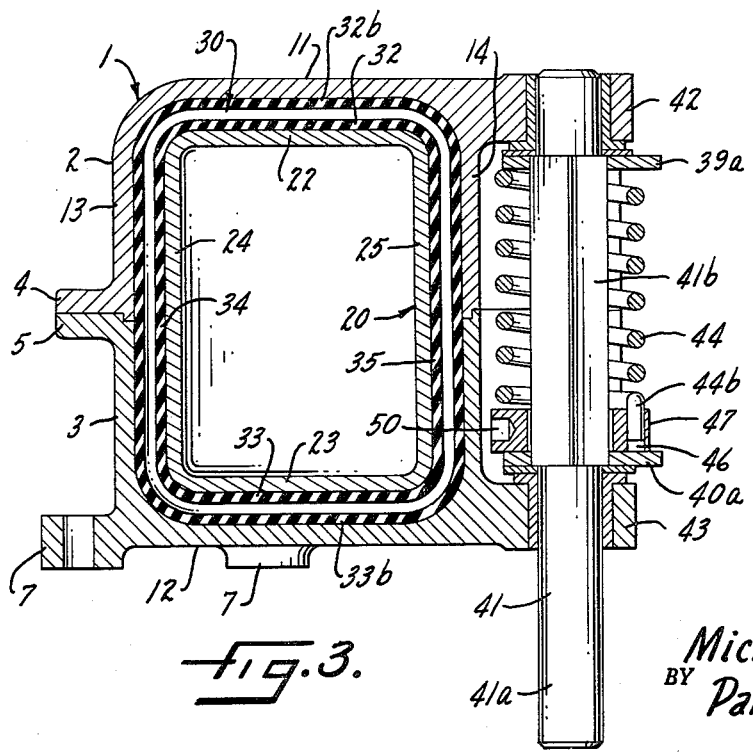

3,051,143
ACTUATOR
Michael J. Nee, 6148 N. Keystone, Chicago 48, Ill.
Filed Apr. 19, 1961, Ser. No. 104,025
4 Claims. (Cl. 121—48)

This invention relates to actuators and has particular relation to actuators employing pneumatic or hydraulic forces.

Actuators employing hydraulic or pneumatic forces and comprising cylinders, pistons and rolling diaphragms in said cylinders are known in the art. In such structures, however, the motion created by introduction of fluid pressure is a linear motion. In those installations requiring rotary motion, such prior actuators have, of necessity, been connected to mechanisms, linkages, gears, swivel joints, levers, spherical sockets, universal joints, and the like in order to convert such linear or straight-line motion into circular or rotary motion. The use of such auxiliary or accessory elements in effecting said conversion leads to additional cost, wear and tear of parts, and larger space requirements. Accordingly, it is one purpose of the invention to provide an actuator capable of producing direct rotary motion in response to the presence of differential pressures.

Another purpose of the invention is to provide a rolling diaphragm rotary actuator effective to produce direct rotary action upon introduction thereto of fluid pressure.

Another purpose is to provide a rolling diaphragm rotary motor effective to produce rotary action upon the introduction of fluid pressure thereto.

Another purpose is to produce a fluid-operated rotary motor.

Another purpose is to provide a fluid motor effective to provide torque upon the introduction of fluid pressure thereto without the employment of any auxiliary or accessory converting mechanisms or devices.

Another purpose is to provide a rotary actuator which can be operated at vacuum, low or high pressure, at low or high temperature, at few or many cycles of service, and that controls motion over the entire range of rotation including control over motion in either direction and control at all points between the limits of rotation.

Another purpose is to retain the advantages of modulation, excellent sealing and smooth operation of a rolling diaphragm while minimizing the hysterisis effect of auxiliary or accessories devices employed in converting linear to rotary motion.

Another purpose is to provide a direct-acting rotary actuator of minimum parts and maximum simplicity in manufacture and use.

Other purposes will appear from time to time during the course of the specification and claims.

I illustrate my invention more or less diagrammatically in the accompanying drawings, wherein:

FIGURE 1 is an end view;
FIGURE 2 is a view in partial cross-section taken on the line 2—2 of FIGURE 1;
FIGURE 3 is a view in partial cross-section taken on the line 3—3 of FIGURE 2; and
FIGURE 4 is a top plan view.

Like parts are indicated by like numerals throughout the specification and drawings.

Referring now to the drawings, and particularly to FIGURE 1 thereof, the numeral 1 generally designates a housing. The housing 1 may be formed of upper and lower housing parts, as the parts are indicated on the drawings herein, such as those designated by the numerals 2, 3 respectively. The housing parts 2, 3 may be jointed together by any suitable means such as by the flanges indicated at 4 on housing part 2 and the mating flanges indicated at 5 on housing part 3, the flanges 4, 5 being joined by any suitable connectors such as the bolts indicated at 6. Similarly, suitable mounting brackets, such as those indicated at 7, may be associated with the housing 1.

The housing 1 has an end wall 10 of generally planar, rectilinear configuration. Extending from one face of wall 10 and in an arcuate path therefrom, are upper and lower housing walls 11, 12 and housing side walls 13, 14. While the outer housing wall 13 and the inner housing wall 14 are formed, as the parts are shown in the drawings, of upper and lower mating portions in housing parts 2 and 3, for convenience, the outer and inner housing walls 13, 14 are designated and described as unitary wall members.

While, as described hereinbelow, the cross-sectional configuration of the housing 1, such as that illustrated in FIGURE 3, may take a variety of forms, the preferred embodiment of the invention is illustrated herein and, as illustrated, rounded wall surfaces join upper wall 11 to outer wall 13 and inner wall 14, and similarly rounded surfaces join outer wall 13 and inner wall 14 to bottom wall 12, the walls 11–14 joining end wall 10 adjacent the periphery thereof in rounded surfaces, as best seen in FIGURE 2.

A fluid pressure inlet 15 is formed in and penetrates end wall 10. A suitable fluid pressure valve member 16 is positioned in inlet 15 and is effective to control the admission of fluid pressure into housing 1 through inlet 15.

Movable in housing 1 is a piston member 20. The piston member 20 has an end wall or surface 21 having the same general planar configuration as that of end wall 10 but, as may be best seen in FIGURES 2 and 3, having dimensions somewhat less than those of end wall 10. Extending from end wall 21 of piston 20 are upper and lower arcuate wall members 22, 23 and outer and inner arcuate wall members 24, 25. It will be observed that the wall members 22–25 of piston 20 are formed on the same arcs as the wall members 11–14 of housing 1 and that each of the piston wall members or surfaces 22–25 is inwardly spaced from the opposed respective wall or surface portions 11–14 of housing 1, as may be best seen in FIGURE 3. Similarly, the piston wall segments 21–25 are joined in curved surfaces in the manner of joinder of housing walls 10–14, the curved surfaces of the piston 20 being inwardly spaced from the opposed curved surfaces of housing 1.

Indicated generally at 30 is a non-porous, flexible diaphragm member of the type known in the art as a rolling diaphragm. The diaphragm 30 has an end wall 31 corresponding in planar configuration to and in continuous contact with the outer surface of piston wall 21. The diaphragm 30 has upper and lower arcuate wall portions 32, 33 and outer and inner wall portions 34, 35 extending from wall 31 and lying in contact with, as the parts are shown in full lines in FIGURES 2 and 3, the corresponding piston wall portions 22–25 respectively.

It will be observed that outer housing wall 13, outer piston wall 24 and outer diaphragm wall 34 are of a greater arcuate extension than inner housing wall 14, inner piston wall 25 and inner diaphragm wall 35, and that upper and lower housing walls 11, 12, upper and lower piston walls 22, 23 and upper and lower diaphragm walls 32, 33 are arcuate in planar configuration, while outer and inner housing walls 13, 14, outer and inner piston walls 24, 25, and outer and inner diaphragm walls 34, 35 are arcuate in horizontal cross-section, as the parts are shown in the drawings.

Outer and inner diaphragm walls 34, 35 are bent back upon themselves in a convolution indicated, for convenience, at 34a, 35a in FIGURE 2. It will be realized that the portions indicated at 34a, 35a are but two parts of a continuous convolution which occurs about the entire periphery of piston 20, the diaphragm 30 being of the same lateral cross-sectional configuration as piston 20 and housing 1.

The diaphragm 30 includes the continuing portions 34b and 35b, of outer diaphragm wall 34 and inner diaphragm wall 35, the portions 34b, 35b lying along and in contact with the inner surfaces of outer housing wall 13 and inner housing wall 14, respectively. Similarly, diaphragm upper housing wall 32 has a continuing portion 32b and lower diaphragm wall 33 has a continuing portion 33b lying against the inner surface of upper housing wall 11 and lower housing wall 12, respectively.

It will be realized that the rounded corner junctures of the diaphragm walls, while not separately numeraled for convenience, have portions lying against the rounded corners of the piston 20, portions convoluted as a part of the convolution 34a, 35a, and continuing portions returning along the curved corners of the walls of housing 1.

The return, or outer diaphragm walls 32b–35b join, at their forward extremity, a second end wall 36 of diaphragm 30 which lies against the inner surface of housing wall 10. The diaphragm wall 36 has an aperture 37 through which valve 16 extends, the enlargement or head 16a of valve 16 serving to clamp the portion of diaphragm wall 36 about aperture 37 against the inner surface of housing wall 10 which surrounds inlet 15.

The housing 1, as shown in the drawings herein, is open at its end opposite the end wall 10, as indicated generally at 38. Secured to piston 20 are a pair of upper and lower arms 39, 40. The arms 39, 40 extend from the rear edges of upper and lower piston walls 22, 23 respectively, and terminate in end portions curved back upon the arms 39, 40 at a point outside the housing 1 and immediately adjacent the inner curved wall 14 of housing 1 for maximum compactness in the over-all unit. The terminal portions 39a, 40a of piston arms 39, 40 are secured and fixed, in any suitable manner, to a shaft 41 which in turn is journalled in spaced bearings 42, 43 which may, for convenience, be formed on housing 1. While the shaft 41 is illustrated as having a lower, as the parts are shown on the drawings, portion 41a extending beyond housing 1 for attachment of suitable mechanism to be rotated, it will be understood that the shaft 41 could extend as well from the upper shaft bearing or boss 42 without departing from the nature and scope of the invention. Thus the shaft 41 may be employed to rotate elements on either or both sides of housing 1.

A coil spring 44 is arranged about shaft 41 between bosses 42, 43 and has one of its ends 44a held in a groove 45 formed in housing 1 adjacent bearing 42. The opposite end 44b of spring 44 is held in a groove or socket 46 formed in an adjustment nut or collar member 47 which surrounds the shaft 41 adjacent piston arm 40a and between the piston arm 40a and boss 42. That portion 41b of the shaft 41 which is between bosses 42, 43 may have one or more flattened longitudinal surfaces, the same being shown as hexagonal and best seen, for example, in cross-section in FIGURE 2. The collar 47 has one or more threaded passages, such as that shown at 48, radially disposed therein for reception of locking screws or bolts 49, the latter being moved through passage 48 by the use of any suitable tool for locking contact with an opposed flattened surface of shaft portion 41b. A plurality of radially spaced sockets are formed in the circumferential wall of collar 47, as indicated at 50, for reception of a suitable collar rotating tool.

The use and operation of my invention are as follows:

As fluid pressure is admitted through inlet 15 and valve 16, the same acts upon the end wall 31 of diaphragm 30 and, through it, upon the end wall 21 of piston 20 to urge the piston through an arcuate path and, through the mediacy of arms 39, 40 to rotate the shaft 41. The pressure entering through valve 16 is effective to urge the arcuate wall portions of diaphragm 30 against the inner arcuate surfaces of housing 1. As the piston 20 moves through its arcuate path, the arcuate diaphragm walls in contact with the arcuate piston portions are rolled off said piston portions and onto the opposed arcuate inner surfaces of housing 1. As rolling occurs the amount of diaphragm material that leaves the piston at any point is proportional to the distance of that point from the axis of rotation. The piston 20, housing 1 and diaphragm 30 are so arranged that as the piston 20 is forced to rotate, all points of the diaphragm on the piston that are the same radial distance from the axis of rotation and that roll from the piston will roll an amount that is directly proportional to their distance from the axis of rotation. This rolling action provides a smooth and frictionless operation while maintaining excellent pressure-sealing effect between opposed portions of housing 1 and piston 20.

During operation all points of diaphragm 30 in contact with housing 1 remain at a fixed distance from the axis of rotation. All points of the diaphragm in contact with piston 20, at any given relative position of piston 20 and housing 1, remain at a fixed distance from the axis of rotation.

While piston 20 is shown in two positions, it is clear that it may be moved to any intermediate position, as desired.

As fluid pressure is diminished in housing 1, the spring 44 is effective to return the piston 20 toward the position illustrated in FIGURE 2. As the piston moves from the position illustrated in dotted lines in FIGURE 2 to the position illustrated in full lines in FIGURE 2, the portions which had earlier been rolled off the piston onto the housing walls are rolled back from the housing walls onto the opposed piston walls.

Since the action of piston 20 is controlled by the amount of fluid pressure delivered to the diaphragm 30 within housing 1 through valve 16 in relation to the resistant forces of the spring 44 acting upon piston 20 to urge it against such fluid pressure through the mediacy of shaft 41 and arms 39, 40, the structure of my invention may be adjusted by varying the resistant forces produced by spring 44. To accomplish the latter, the adjustment collar 47 is disengaged by withdrawing the locking keys or screws 49, rotating the collar 47 to move the spring end 44b in either clockwise or counterclockwise direction to increase or decrease the spring forces of spring 44 and thereafter repositioning the locking screws 49 against the flattened surfaces of shaft portion 41b to lock collar 47 in its new position and to retain the spring under greater or lesser tension, as desired.

It will be understood that, whereas I have described the operation of the device illustrated in the drawings and set forth in the foregoing description, many changes may be made in the shape, sizes, number and disposition of parts without departing from the nature and scope of the invention. For example, since it is clear that piston 20 could be held in place and housing 1 could be moved upon introduction of fluid pressure thereinto, all reference to movement of piston 20 with respect to housing 1 should be considered as a reference to relative motion. Similarly, while the diaphragm 30 is illustrated as having a second forward wall 36 positioned against the inner surface of housing wall 10, it will be understood that the outer walls 32b–35b of diaphragm 30 could terminate at a point adjacent housing wall 10 but inwardly spaced therefrom, the said terminal ends of said housing walls having suitable beads or flanges secured to the arcuate walls of housing 1. In such event, it would be expected that the end wall 10 would constitute an end cap clamping such bead or flange against the remaining or arcuate portion of housing 1. With reference to yielding resistant forces, a torsion spring is coiled about shaft 41 as the preferred and highly effective embodiment serving to enhance compactness and reduce weight, while it will be recognized that other forms and arrangement of yielding elements may be employed. As another example, the piston, housing and diaphragm are illustrated in the drawings herein as being generally rectilinear in cross-section, but it will be understood by those skilled in the art upon observing the figures herein that, while these elements can be expected to have essentially the same cross-sectional configuration as between each other, they may take a variety of cross-sectional forms, including circular, elliptical, and even non-symmetrical, without departing from the nature and scope of the invention. Only those portions of diaphragm 30 positioned between the arcuate walls of housing 1 and piston 20 are required for operation of the device, it being understood that diaphragm 30 could have its ends suitably, sealingly clamped to housing 1 and piston 20. Similarly, while the piston wall 21 is shown as lying in a radial plane of the arc of housing 1, piston 20 and diaphragm 30, it will be understood that the piston wall 21 could lie in a non-radial plane without destroying the effect of the device and also that it need not of necessity be flat. Also, while FIGURE 2 shows piston 20 as movable through about 90° of arc, the device of the invention may be arranged for operation through arcs of greater or less degrees. Further, while the housing 1 is shown as being open at 38, it will be understood that a suitable dust cover or closure for the housing 1 could be supplied and with suitable provision for movement of arms 39, 40 therethrough. As above indicated, the piston 20 could be held stationary and the housing 1 could be employed as the moving member in response to the introduction of a differential fluid pressure across the diaphragm wall without departing from the nature and scope of my invention. In such case, of course, the mechanism to be rotated would be suitably connected to housing 1. In that case also, fluid pressure may be delivered to diaphragm 30 within housing 1 through piston wall 21 and diaphragm wall 31 or, alternatively, a movable or flexible source of fluid pressure could be secured to inlet 15. Similarly, when the piston 20 is moved it could be connected directly to the item to which rotary motion is to be imparted, such as a valve, valve stem, pivot point, damper shaft or the like.

When a vacuum is employed in the operation of the invention, diaphragm 30 may be reversed and attached to the opposite ends of housing 1 and piston 20.

The required differential pressures may be created by the presence of fluid on opposite sides of diaphragm 30 (the open end of housing 1 being closed) with maintenance of a greater pressure always on the left-hand side, as the parts are shown in the drawings, to prevent distortion of diaphragm 30.

Thus, whereas I have described and claimed a preferred embodiment of my invention, it will be understood that further modifications will suggest themselves to those skilled in the art upon a reading of the foregoing specification. Accordingly, the foregoing description should be taken as merely illustrative and not definitive, and the scope of the invention should be limited only by the following appended claims.

I claim:

1. An actuator comprising arcuate housing, an arcuate piston movable in said housing and having its walls inwardly spaced from the walls of said housing, a rolling diaphragm in said housing, portions of said diaphragm being positioned to roll off and on said piston and said housing walls when relative motion occurs between said piston and said housing, a shaft rotatably mounted on said housing, an arm formed integrally with said piston and having an actuating engagement with said shaft effective to produce rotation of said shaft in response to movement of said piston within said housing, a torsion spring surrounding said shaft, one end of said spring being secured to said housing, the opposite end of said spring being adjustably secured to said shaft, movement of said piston within said housing being effective to rotate said shaft in one direction and to produce a tightening of said spring.

2. The structure of claim 1 wherein said shaft has a pair of spaced rounded portions rotatably mounted in said housing and a non-round portion intermediate said rounded portions and wherein said piston arm actuatingly engages said non-round portion.

3. The structure of claim 1 wherein the end of said spring which is not secured to said housing is secured to a ring and said ring surrounds said shaft and includes means for locking said ring at a variety of positions intermediate the ends of said shaft to vary the compression of said spring.

4. The structure of claim 1 wherein said shaft is mounted for rotation about an axis paralleling the axis of rotation of said piston.

References Cited in the file of this patent

UNITED STATES PATENTS

| | | |
|---|---|---|
| 1,076,120 | Hobbs | Oct. 21, 1913 |
| 1,492,158 | Caretta | Apr. 29, 1924 |
| 2,725,078 | Glancy | Nov. 29, 1955 |

FOREIGN PATENTS

| | | |
|---|---|---|
| 568,222 | Great Britain | Mar. 23, 1945 |